United States Patent Office 3,574,827
Patented Apr. 13, 1971

3,574,827
OINTMENT BASE COMPOSITION
Alan Beerbower, Scotch Plains, N.J., assignor to Esso Research and Engineering Company
No Drawing. Filed Dec. 29, 1966, Ser. No. 605,557
Int. Cl. A61k 9/06, 7/00
U.S. Cl. 424—83                                    5 Claims

ABSTRACT OF THE DISCLOSURE

Unctuous ointment bases for topical application are prepared by gelling synthetic or natural white oils with polypropylene or ethylene-propylene copolymer of 80 to 95 wt. percent isotactic content.

---

The present invention relates to novel unctuous ointment bases and to their process of preparation. More particularly, the invention relates to the compounding of natural and synthetic white oils with certain propylene polymers and copolymers for the preparation of bases for cosmetics, medicines, and other topical applications which have a smooth homogeneous consistency, which are free from bleeding or oil separation and which adhere efficaciously to the skin for many types of topical applications.

Viscous gel compositions for the general purposes mentioned above are known and have, in many instances in the past, been compounded with petrolatum, beeswax, lanolin, etc. Also, in the past, mineral oils which are highly refined white oils have been employed in admixture with polyethylene for the purpose of compounding homogeneous bases into which medicaments and cosmetic additives have been incorporated as evidenced by the teachings contained in Frohmader et al., U.S. Patent No. 2,628,187, patented Feb. 10, 1953, Hellig, U.S. Patent No. 3,079,299, patented Feb. 26, 1963, Mutimer et al., J. Am. Pharm. Assoc. Sci. Ed. vol. 45, page 212 (1956), vol. 45, page 101 (1956), and Thau et al. J. Soc. Cosmetic Chemists, vol. 16, pages 359–363 (1965). These polyethylene-mineral oil gels have been employed as bases or vehicles for various dermatological ointments, salves, and the like and they have been employed as bases for the preparation of cosmetic formulations as well. While the last mentioned compositions have constituted a great advance in the art of preparation of ointments, they have still experienced some difficulties in that their manufacture requires extensive mixing and milling, much time and labor, and requires a considerable amount of plant space and more or less inefficient machinery to compound. In some instances, the medicaments incorporated into such bases tend to separate and segregate with time and with changes in temperature and, along with aging, the viscosities of the ointments or salves so compounded tend to change. The treating agents incorporated thereinto are not always efficaciously released so that they are readily absorbed by the skin, particularly so if the topical application of the compounded ointment or salve takes place after a considerable length of time following the original compounding of the ointment or salve.

The novel compositions hereinafter described in detail in an increased degree tend to minimize ingredient separation in the salves after long standing while, at the same time, avoiding granulation or lumpiness in the consistency of the salves. The novel unctuous ointments, using the hereinafter described bases, readily adhere to the skin, tend to remain homogeneous over long periods of time while at the same time provide effective vehicles for the efficacious application to the skin of medicaments or cosmetic ingredients which are readily contacted and absorbed by the skin. The novel gel compositions homogeneously retain the medicaments and cosmetic specifics incorporated thereinto yet effectively release the same for their intended action upon application of the novel vehicles containing the same to the skin.

The novel unctuous ointments are comprised of the conventionally employed white oils of either natural or synthetic origin homogeneously admixed with between about 5 and about 25 wt. percent, based on the weight of the compounded base, of a specific type polymer selected from the group consisting of polypropylene and certain specified copolymers of ethylene with propylene. The specific polymers incorporated or admixed with the specified white oils have been found to be effective for accomplishing a smooth, non-separable unctuous ointment which is homogeneous in character only if these polymers contain an isotactic (crystalline) content greater than 80% but not exceeding 95%. In other words, the amount of atactic (amorphous) polymer present must range between about 5 and about 20% of the total copolymer, the remainder being of crystalline character. If a propylene homopolymer or an ethylene-propylene copolymer is employed wherein the amount of atactic (amorphous) material is either less or greater than from 5% to 20%, final ointments are prepared which are either too tacky or stringy if more than 20% atactic (amorphous) material is present or they are too granular and lumpy if less than 5% atactic (amorphous) material is present. If the degree of crystallinity of the polymer exceeds 93%, the white oil tends to readily separate from the ointment base and if more than 20% atactic (amorphous) material is present, the ointment base becomes too rubbery for topical ointment applications.

The separation of oil or other additive ingredients from the ointment has been one of the drawbacks encountered in many previously disclosed ointments. In other words, a permanently homogeneous ointment composition is desired and while the polyethylene compounded ointments have, to a considerable degree, achieved this objective, they have not been completely satisfactory in this respect. The instant novel compositions constitute an improvement thereover. This is believed to be attained largely because of the relatively higher number average molecular weight of the olefinic polymers and copolymers as compared with the polyethylene polymers heretofore employed.

The number average molecular weight of the propylene polymers incorporated into the present ointment base vehicles ranges generally between about 10,000 and about 150,000, preferably between about 30,000 and about 80,000. The molecular weight of the polyethylene polymers used heretofore generally ranged between about 1,500 and about 5,000 and, although in the past there has been a recognition of the influence of crystallinity and the amorphous form of polyethylene and the ratio of one to the other upon the feasibility of providing a smooth non-separable ointment base, nevertheless, the instant polymers, because of their higher molecular weight, provide a precise means of achieving the desired ultimate ointment characteristics through the compounding of unctuous bases far less susceptible of liquid separation upon standing and aging than has heretofore been thought possible in connection with the polyethylene compounded white oil bases.

The polymers found to be useful in preparing the herein described novel unctuous homogeneous ointments, salves, or bases are rather specific in nature. Polypropylene is advantageously employed if it satisfies the crystalline-amorphous characteristics hereinbefore described and if it has a number average molecular weight as hereinbefore described. With respect to the ethylenepropylene copolymers, care must be taken to employ only those copolymers which exhibit only wax-like or plastic properties. It is desired to exclude from use in the preparation of the presently described unctuous ointments, those copolymers of ethylene and propylene which are best described as being plastomers or elastomers. Only those copolymers which are formed by the metallo alkyl polymerization catalysis of ethylene-propylene mixtures in which the ethylene is present up to 10 mole percent and the propylene is present in 90 mole percent or better concentration will yield isotactic copolymers of crystallinity between 80% and 95%. The polymerization of ethylene-propylene mixtures wherein the ethylene is present in from 10 to 20 mole percent ethylene with the balance being propylene yields copolymers containing more than 20% atactic copolymer, or rubbery copolymer. Such compositions are unsuitable for compounding into the present novel composition. Considering the other aspect of the preparation of ethylene-propylene copolymers, reactive polymerization compositions which are composed predominantly of ethylene and contain up to 25 mole percent of propylene, will yield copolymers which are either crystalline or plastomeric in nature. But if such copolymers are to be employed in compounding the present novel unctuous bases, care should be taken that the amount of propylene does not exceed 15 mole percent in the polymerizing reaction mixture, otherwise, the degree of crystallinity of the copolymer falls below 80% and the properties of such a copolymer are such that the final compounded ointment does not possess the desired required properties of consistency, smoothness, and non-separability of liquid ingredients upon aging, storage, and standing. Typical polymeric materials which may be employed are the following: A polypropylene having a number average molecular weight of about 70,000, prepared by the usual metallo alkyl polymerization reaction and containing about 85.8 wt. percent isotactic with the balance (14.2 wt. percent) being atactic content; a polypropylene having a number average molecular weight of about 50,000 and having about 8% atactic (amorphous) content; an ethylene-propylene copolymer prepared using 10 mole percent of ethylene and 90 mole percent of propylene having a number average molecular weight of about 60,000, an ethylene-propylene copolymer prepared from a reaction mixture containing about 15 mole percent propylene and about 85 mole percent of ethylene having an average number molecular weight of about 50,000 and an isotactic polypropylene of about 100,000 number average molecular weight and containing about 10% of atactic polypropylene.

The natural or synthetic mineral or hydrocarbon white oils are highly refined or extremely pure fractions of hydrocarbons of +30 Saybolt color, having a viscosity of between about 30 and about 500 Saybolt Universal Seconds (SUS) measured at 100° F. In all cases and for practical purposes, the purity of the white oils, whether natural or synthetic, must satisfy the specifications for the National Formulary (N.F.) or the United States Pharmacopoeia (U.S.P.). In either case the oils must be free of aromatic content as determined by the process outlined in ASTM D-2269-64T. Typical white oils are heavy alkylates such as those obtained in the alkylation of isobutylene with the butenes, the oligomers of $C_6$ to $C_{10}$ alpha olefins such as the dimers and trimers thereof, which are hydrogenated to saturation to yield isoparaffinic $C_{12}$ to $C_{30}$ fractions and the like. Additionally, hydrogenated polybutenes having the specified color and viscosity characteristics may be used as synthetic white oils. Any white oil of natural or synthetic origin meeting the N.F. or U.S.P. purity specifications and having a Saybolt viscosity measured at 100° F. of between about 30 and about 500 SUS may be employed. Typical white oils which have been found to be particularly useful have the following inspections:

|  | Intermediate N.F. grade mineral white oil | U.S.P. petroleum white oil | Isopar M, Synthetic white oil [1] |
|---|---|---|---|
| Saybolt color | +30 | +30 minimum | +30 minimum. |
| Viscosity @ 100° F., suspended. | 71–78 | 355–375 | 33–35. |
| Flash point, Cleveland Open Cup, minimum. | 300° F | 425° F | 175° F. |
| Pour point, maximum. | 0° F | −15° F | −70° F. |
| 60/60 specific gravity. | .860–.875 | .880–.890 | .775–.801. |

[1] A heavy alkylate formed by the alkylation of isobutane with butenes.

In general, the novel olefin-polymer base or vehicle contains between about 4 and about 10 wt. percent of polymer but there is a distinct inter-relation for producing the desired unctuous homogeneous base between the amount of oil employed and the amount of polymer employed. To a large extent, this depends upon the viscosity of the oil and upon the particular degree of crystallinity of the polymer and its molecular weight. The modifying effect of the propylene polymer or copolymer increases as the molecular weight of the copolymer increases. Similarly, the modifying effect of the oil increases as the viscosity of the oil increases. Relative amounts of crystalline and amorphous forms of the polymer are as before stated, namely, the more amorphous polymer present, the greater the degree of tackiness or rubberiness in the final ointment base and the lesser the amount of amorphous polymer to crystalline polymer, the greater the degree of lumpiness, granulation, and liquid separation of the final ointment base. The higher the molecular weight of the polymer employed, the lesser amounts that are required to achieve the same degree of unctuousness, smoothness and homogeneity of the ointment base and the more or greater the amount of oil that can be incorporated into the base to achieve those properties in the base. Typical specific correlations to achieve satisfactory ointment bases are shown in the specific examples which hereinafter are described in detail.

There are several satisfactory methods for achieving the final admixture of polymer and oil and for obtaining a satisfactory ointment base which is conducive to the minimum separation of incorporated liquid ingredients therefrom even over periods of long standing, storage, shelf life, and the like. One method involves the use of a propeller type stirrer, conventional loop or paddle for agitating the ingredients in a container under relatively mild agitation conditions while maintaining a temperature of at least 20° C. above the cloud point of the admixture. In general, the temperature maintained will range between about 140° C. and about 225° C. for all practical purposes. Higher temperatures may be employed in some instances but they are unnecessary. Lower temperatures may be employed in some instances where the cloud point is below 110° C.–120° C. but for practical commercial operations, temperatures between about 140° and 225° C. will suffice. Once a homogeneous admixture has been achieved and as it has previously been taught, a rapid cooling or chilling of the homogeneous admixture is desired at least down to the cloud point of the admixture. This is standing commercial practice in the preparation of ointments and is designed to maintain a uniform gel at the gel point. The rate of cooling is generally maintained at least at the rate of 3.0° C. per minute. Best results are achieved commercially if the rate of cooling is even faster, i.e., at from 6° to 10° C. per minute. Usually and conveniently, this is accomplished by pouring or otherwise contacting the homogeneous liquid admixture onto a flat plate or rotating drum as a thin film where the drum or plate is cooled with cold running water or is directly or indirectly refrigerated to an even lower temperature. The semi-solidified chilled admixture is stripped from the drum or plate and is packaged or stored as desired.

Many types of conventionally employed medicaments or ingredients of cosmetic creams may be incorporated into the unctuous base at the time of cooling or after the admixture has cooled. In some instances where volatility considerations are not important, the added ingredients such as medicaments may be incorporated into the molten or liquid admixture prior to the gelling or cooling operation.

The present novel composition and its method of production are not dependent upon any particular medicaments incorporated into it for ultimate specific uses. Suffice it to say that antiseptics, antibiotics, burn treatment agents, wound healing agents, agents for the treatment of dermatitis, perfumes and ingredients conventionally employed in cosmetic creams, added ointment ingredients such as zinc oxide, and all of the conventionally employed medicaments customarily employed in salves or ointments are contemplated as being suitably and conventionally added to the herein described novel ointment base. The present invention does not depend upon any specific conventionally employed additive but is broadly concerned with a novel ointment base and its method of preparation.

Still a second accepted method of preparing the homogeneous admixture of white oil and propylene polymers and copolymers involves substantially the same procedural steps as hereinbefore described. However, it differs from the previously described procedure in that a high speed turbine-stator mechanism with a fixed clearance is employed so that a high shear type mixing is accomplished. This high speed micro agitator type of mixing more efficiently disperses the polymer into and with the white oil so that a homogeneous dispersion is effected in an efficient manner with the resultant gel formation, upon shock cooling, is accomplished. Such a process is described in the Thau et al. article, supra.

The following examples are illustrative of the nature of the herein described novel compositions, and their method of preparation but it is not intended that the invention be limited thereto.

EXAMPLE 1

13 grams of a polypropylene of a number average molecular weight of about 70,000 and composed of about 85.8 wt. percent of isotactic polypropylene, the remaining portion (14.2 wt. percent) being atactic polypropylene, was mechanically admixed with about 187 grams of the previously described highly refined white oil having a viscosity of between about 355 and about 375 SUS at 100° F. The mixture was heated to about 175° C. and was stirred with a propeller stirrer until all of the added polypropylene dissolved. This was accomplished in about 1.5 hours under the conditions obtaining. The hot solution was then shock cooled by pouring it onto a metal plate which was maintained at a temperature of 20° C. by cooling it with running water underneath the plate. This ointment base, 6.5 wt. percent polypropylene, was tested for consistency by subjecting it to the ASTM Cone Penetration Test (ASTM–D–217–60T). It gave a value of 250 mm./10 (250÷10).

This same composition was subjected to a Haake Viscosity determination. This determination is described in J. R. Van Wazer et al., "Viscosity and Flow Measurement" (1963), Chapter 3, Interscience Division of John Wiley & Sons, New York, N.Y. The results were as follows:

| Rate of shear, sec.⁻¹ | Viscosity in centipoises | |
|---|---|---|
| | Initial | Final |
| 83.5 | 1,300 | 1,100 |
| 502 | 316 | 250 |
| 2,255 | 140 | 117 |
| 13,511 | 36 | 34 |

¹ Measured at decreasing rate of shear after test at 13,511 sec.⁻¹.

These results indicate the gel to have a pseudo-plastic flow pattern which makes it eminently suitable as a base for topical application ointments.

EXAMPLE 2

20 grams of an isotactic polypropylene having a number average molecular weight of 60,000 and containing 8 wt. percent of atactic polypropylene was admixed with about 180 grams of the previously described synthetic white oil having a viscosity of 35 SUS at 100° F. The container was covered with aluminum foil and the mixture was heated to 165° C. while stirring with a propeller type mixer. The stirring at this temperature was continued until all of the polypropylene added dissolved and became homogeneous with the synthetic white oil. This took about 1 hour. The hot solution was then shock cooled to form the gel in the manner described in Example 1. The penetration rate of the finished base composition by the same ASTM method was 265 mm./10. This composition possessed the same generally desirable properties as that described with reference to the base composition of Example 1.

Having set forth the general nature and specific embodiments of the present invention, what is desired to be secured by Letters Patent is:

1. An unctuous homogeneous ointment base composition consisting essentially of a white oil having a viscosity ranging between about 30 and about 500 SUS at 100° F. containing between about 5 and about 25 wt. percent of isotactic polypropylene or ethylene-propylene copolymer having a number average molecular weight of between about 10,000 and about 150,000 and containing between about 5 and about 20 wt. percent of amorphous material, the balance of the polymer or copolymer being crystalline material.

2. A composition as in claim 1 wherein the composition contains isotactic ethylene-propylene copolymer.

3. A composition as in claim 1 wherein the composition contains isotactic polypropylene.

4. A composition as in claim 3 wherein the isotactic polypropylene contains about 14.2 wt. percent of atactic polypropylene.

5. A composition as in claim 4 wherein the polypropylene of about 70,000 number average molecular weight and constitutes about 6.5 wt. percent based on the oil and polypropylene combined weight.

References Cited

UNITED STATES PATENTS

| | | | |
|---|---|---|---|
| 2,627,938 | 2/1953 | Frohmader et al. | 183—45 |
| 2,628,205 | 2/1953 | Shoemaker | 260—29.6 |
| 2,775,561 | 12/1956 | Frohmader | 252—308 |
| 3,088,876 | 5/1963 | Buth | 167—85 |
| 3,215,599 | 11/1965 | Thau et al. | 167—83 |

OTHER REFERENCES

Concise Guide To Plastics, Simonds, H. R. et al., p. 55, 1963.

Polypropylene, Kresser, T. p. 260, 1961.

SAM ROSEN, Primary Examiner

U.S. Cl. X.R.

424—358

PO-1050
(5/69)

UNITED STATES PATENT OFFICE
CERTIFICATE OF CORRECTION

Patent No. 3,574,827          Dated April 13, 1971

Inventor(s) Alan Beerbower

It is certified that error appears in the above-identified patent and that said Letters Patent are hereby corrected as shown below:

Claim 5, after "polypropylene" insert --contains about 14.2 wt. % atactic polypropylene --.

Signed and sealed this 6th day of June 1972.

(SEAL)
Attest:

EDWARD M. FLETCHER, JR.          ROBERT GOTTSCHALK
Attesting Officer                 Commissioner of Patents